(12) United States Patent
Yuasa et al.

(10) Patent No.: US 7,517,613 B2
(45) Date of Patent: Apr. 14, 2009

(54) POSITIVE ELECTRODE MATERIAL FOR LITHIUM SECONDARY BATTERY AND LITHIUM SECONDARY BATTERY USING THE SAME

(75) Inventors: Toyotaka Yuasa, Hitachi (JP); Masahiro Kasai, Mito (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 810 days.

(21) Appl. No.: 11/020,034

(22) Filed: Dec. 23, 2004

(65) Prior Publication Data

US 2005/0142442 A1 Jun. 30, 2005

(30) Foreign Application Priority Data

Dec. 26, 2003 (JP) ............................... 2003-435660

(51) Int. Cl.
- *H01M 4/50* (2006.01)
- *H01M 4/52* (2006.01)
- *C01G 45/12* (2006.01)
- *C01G 51/04* (2006.01)
- *C01G 53/04* (2006.01)

(52) U.S. Cl. .................... 429/223; 429/224; 429/231.1; 429/231.3; 423/594.4; 423/594.6; 423/599

(58) Field of Classification Search ................. 429/223, 429/224, 231.1, 231.3; 423/594.4, 594.6, 423/599

See application file for complete search history.

(56) References Cited

U.S. PATENT DOCUMENTS

| | | | |
|---|---|---|---|
| 6,632,565 B2 * | 10/2003 | Nemoto | ................... 429/218.1 |
| 2001/0031391 A1 | 10/2001 | Hironaka et al. | |
| 2005/0260496 A1 | 11/2005 | Ueda et al. | |

FOREIGN PATENT DOCUMENTS

| | | |
|---|---|---|
| JP | 2000-294240 | 10/2000 |
| JP | 2001-325949 | 11/2001 |
| JP | 2002-151076 | 5/2002 |
| JP | 2003-031219 | 1/2003 |
| JP | 2003-238165 A | 8/2003 |

* cited by examiner

*Primary Examiner*—Stephen J. Kalafut
(74) *Attorney, Agent, or Firm*—Antonelli, Terry, Stout & Kraus, LLP.

(57) ABSTRACT

A positive electrode material for a nonaqueous lithium secondary battery and a lithium secondary battery that has superior cycle life and safety and reduced internal resistance of the battery at low temperature is provided. The positive electrode material for a nonaqueous lithium secondary battery comprise a layered structured complex oxide expressed by a composition formula $Li_aMn_xNi_yCo_zM_\alpha O_2$, where $0 < a \leq 1.2$, $0.1 \leq x \leq 0.9$, $0 \leq y \leq 0.44$, $0.1 \leq z \leq 0.6$, $0.01 \leq \alpha \leq 0.1$, and $x+y+z+\alpha=1$. A diffraction peak intensity ratio between the (003) plane and the (104) plane (I(003)/I(104)) in an X-ray powder diffractometry using a Cu—Kα line in the X-ray source is not less than 1.0 and not more than 1.5.

11 Claims, 4 Drawing Sheets

POSITIVE ELECTRODE MATERIAL FOR LITHIUM SECONDARY BATTERY AND LITHIUM SECONDARY BATTERY USING THE SAME

BACKGROUND OF THE INVENTION

1. Field of the Invention

The present invention relates to a layer structured positive electrode material for a large lithium secondary battery that uses nonaqueous electrolytic solution, a positive plate, and to a lithium secondary battery. More specifically, the present invention relates to improvement of Li ion conductivity of a positive electrode material for a lithium secondary battery at low temperature.

2. Background Art

There has been demand for developing high power and high energy density batteries for power supply of electric automobiles and hybrid automobiles as environmentally friendly vehicles. Since lithium secondary batteries that use nonaqueous electrolytic solution have high battery voltage and high energy density as batteries used for power supply, various sectors have been industriously developing them. Also, batteries for automobiles are required to have long operating life, high power output, stable voltage controllability, environment resistance, and high safety, for example, in addition to the properties of conventional consumer batteries.

In order to extend the operating life of lithium ion secondary batteries, JP Patent Publication (Kokai) No. 2000-294240 A discloses a positive electrode material for trying to improve cycling characteristics. The material is represented by a composition of $LiNi_xMn_{1-x}O_2$ ($0.05 \leq x \leq 0.3$) resulting from $LiNiO_2$ when Ni is substituted with Mn. In this case, layered lithium transition metal complex oxide, which is a positive electrode material, has a hexagonal crystal structure, and the crystal structure has a great influence on lithium ion insertion and extraction. Moreover, when the X-ray diffraction is carried out for the positive electrode material, the diffraction peak of a (003) plane is characteristic of a layered rock-salt structure, and the diffraction peak of a (104) plane is common to both the layered rock-salt structure and a cubic rock-salt structure. Thus, JP Patent Publication (Kokai) No. 2000-294240 A defines the proportion of the cubic rock-salt structure in the layered rock-salt structure in accordance with the diffraction peak intensity ratio of the (003) and (104) planes, and discloses the fact that the positive electrode material has superior cycling characteristics if the proportion is appropriate. Ni and Mn are in solid solution and form the cubic-rock salt structure (Mn) in layered Ni, which is a system that includes no Co. If this technology is applied to batteries for hybrid automobiles, the cycling characteristics are insufficient because of high Ni composition ratio in the positive electrode material, and the internal resistance of the batteries at −30° C. is high.

In contrast, JP Patent Publication (Kokai) No. 2002-151076 A discloses a positive electrode material represented by a composition of $LiaNi_{1-b-c}CO_bMn_cO_2$ ($1.02 \leq a \leq 1.09$, $0.05 \leq b \leq 0.35$, $0.15 \leq c \leq 0.35$, $0.25 \leq b+c \leq 0.55$) that results in high density of battery capacity and superior cycling characteristics and heat stability by defining the peak intensity ratio $(I(012)+I(006))/I(101))$ upon X-ray diffraction, the average particle diameter, and the specific surface area of the positive electrode material. However, the aforementioned definition cannot be applied when the amount of Ni included in the transition metal of the positive electrode material is small, namely, not more than 45% in the atomic ratio, or when Ni is substituted with other transition metal whose ionic radius is different from that of Ni. Further, by the technology disclosed in JP Patent Publication (Kokai) No. 2002-151076 A, the amount of Ni included in the transition metal of the positive electrode material is high, namely, not less than 45% in the atomic ratio. If the aforementioned technology is applied to batteries for hybrid automobiles, when the content of Ni is large, cycle life is not sufficient since the crystal structure of the positive electrode material is unstable after a charge/discharge cycle. Also, the internal resistance of the batteries at −30° C. is high.

As mentioned above, the prior art cannot achieve both cycle life and the reduction of the internal resistance of batteries at −30° C.

SUMMARY OF THE INVENTION

Batteries for automobiles are required to operate reliably in a wide range of temperature: from low to high temperature. Especially, when operating lithium secondary batteries at low temperature, the Li ion conductivity of a positive electrode material is significantly decreased due to the low temperature. In order to control a rise of the internal resistance of the batteries under such conditions, the Li ion conductivity of the positive electrode material needs to be increased.

In this case, layered lithium transition metal complex oxide, which is a positive electrode material, comprises a layered lithium single layer and a transition metal layer. Charge and discharge are performed by insertion and extraction of lithium ions for the lithium single layer. Thus, the crystal structure is closely related to the storage and emission of lithium ions. In other words, when transition metal is mixed into the lithium single layer (3b site), which is a positive electrode material, the solid-state diffusion of lithium ions in two dimensions is hindered in the lithium single layer, so that the lithium ion insertion and extraction is impeded in the originally-active layered lithium transition metal complex compound. This crystal structure instability decreases the Li ion conductivity at low temperatures and allows the internal resistance of the batteries to rise or the discharge rate to be reduced. $LiNiO_2$ in which Ni is used, which is a layered positive electrode material, the Ni being more readily reduced to result in a divalent state than Co or Mn, tends to cause lithium defects due to volatilization of lithium salt in the material upon high-temperature calcinations. It has a structure where $Li^+$ (0.90 Å) and $Ni^{2+}$ (0.83 Å), whose ionic radii are substantially the same, are mixed into a vacant site of the lithium single layer.

As mentioned above, in the case of the layered positive electrode material, preferably, the crystal structure is $LiN_ixMe_{1-x}O_2$ (Me: transition metal), which is a layered positive electrode material, and the transition metal is not mixed into the lithium layer so as to increase the Li ion conductivity at low temperature.

Meanwhile, batteries for automobiles are required to have long operating lives, which makes them different from consumer batteries. For example, batteries used for hybrid automobiles are required to have such an operating life as to be capable of repeating pulse charge and discharge for more than hundreds of thousands of times. Thus, a positive electrode material used for the batteries is also required to maintain its crystal structure after a charge/discharge cycle so that structural deterioration would not occur. Also, safety upon short circuit is required, since the batteries for automobiles have higher power and higher energy density than consumer batteries. When a large amount of current flows due to a short circuit, the temperature of the batteries rises, leading to a possibility of ignition. Therefore, the thermal stability of the positive electrode material is also important.

It is an object of the present invention to control a rise of the internal resistance of batteries, by using a layered positive electrode material that has superior cycle life and safety, and that has high Li ion conductivity under low temperature environment. It is also an object of the present invention to provide superior cycle life and safety.

The present invention focuses on the ionic radius of a transition metal in order to resolve the aforementioned issue of Li ion conductivity at low temperature. Substitution with metallic elements whose ionic radii are smaller than that of $Ni^{2+}$ at 0.83 Å causes the percentage of the transition metal mixed into a lithium layer to be reduced. This is effective in improving the Li ion conductivity, since it is suitable for smooth insertion and extraction of Li ions in a layer-structured positive electrode material. Examples of elements whose ionic radii are smaller than that of $Ni^{2+}$ include $Co^{2+}$ (ionic radius: 0.79 Å) and $Mn^{2+}$ (ionic radius: 0.81 Å).

Thus, in order to solve the aforementioned problems, the present invention focuses on (1) the composition ratio of transition metal, (2) the diffraction peak intensity ratio (I(003)/I(104)) of (003) and (104) planes in X-ray powder diffraction measurement, and (3) the specific surface area of the layered positive electrode material, for example, and the present invention was made.

According to the present invention, a nonaqueous lithium secondary battery that has superior cycle life and safety and has improved internal resistance of the battery under low temperature environment, and a layered positive electrode material for a lithium secondary battery can be obtained. Thus, a lithium secondary battery with superior properties can be provided.

DESCRIPTION OF THE PREFERRED EMBODIMENTS

Figure 1:
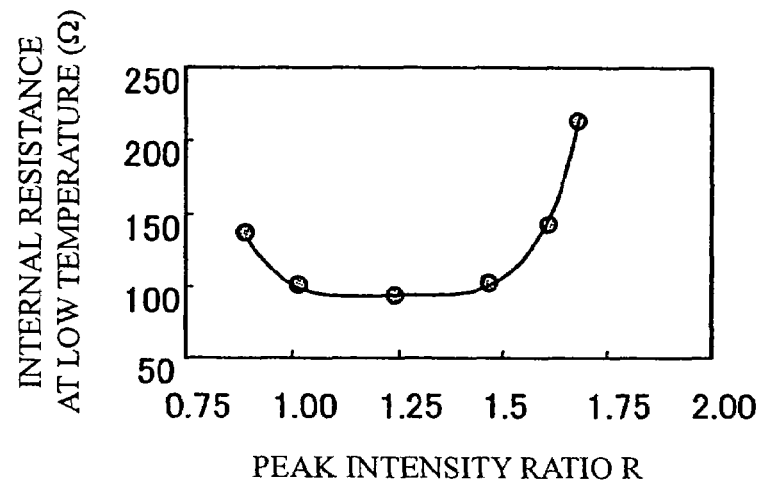
FIG. 1 shows a relationship between the peak intensity ratio and the internal resistance at low temperature.

In the layered positive electrode material according to the present invention, a layered positive electrode material represented by a chemical formula $Li_aMn_xNi_yCo_zO_2$ (where $0<a\leq1.2$, $0.1\leq x\leq0.9$, $0\leq y\leq0.44$, $0.1\leq z\leq0.6$, and $x+y+z=1$) has superior Li ion conductivity. By employing the aforementioned composition ratio, Ni is substituted with Mn and Co whose ionic radius is different from that of Ni, controlling the mixing of transition metal into a lithium single layer, which is a layered positive electrode material, so that superior Li ion conductivity can be realized.

Moreover, the Li ion conductivity can be improved by substituting Mn, Ni or Co of the layered positive electrode material represented by a composition formula $Li_aMn_xNi_yCo_zO_2$, with any one or more types of metallic elements: Al, B, Fe, Cu, Mg, Zn, Ga, and Si whose ionic radius is smaller than that of $Ni^{2+}$. Therefore, the layered positive electrode material that has superior Li ion conductivity is characterized by the chemical formula $Li_aMn_xNi_yCo_zM_\alpha O_2$ (M is at least one type selected from Al, B, Fe, Cu, Mg, Zn, Ga, Si, where $0\leq a\leq1.2, 0.1\leq x\leq0.9$, $0\leq y\leq0.44$, $0.1\leq z\leq0.6$, $0.01\leq\alpha\leq0.1$, and $x+y+z+\alpha=1$). By employing the aforementioned composition ratio, Ni is substituted with Mn and Co whose ionic radii are different from that of Ni, controlling the mixing of transition metal into a lithium single layer, which is a layered positive electrode material, so that superior Li ion conductivity can be realized.

X-ray diffraction is used for evaluating a crystal structure that has superior Li ion conductivity. The lithium layer and the percentage of transition metal in the crystals of the layered positive electrode material can be evaluated by the peak intensity ratio of (003) and (104) of the positive electrode material using the X-ray diffraction. In the case of R=I(003)/I(104), when R is large, the amount of the transition metal mixed into the lithium layer is small. The positive electrode material that has a small amount of the transition metal mixed into the lithium layer can carry out insertion and extraction of lithium ions, and has superior Li ion conductivity.

The layered positive electrode material by the aforementioned composition that has a crystal structure superior in the Li ion conductivity is characterized in that the peak intensity ratio R (R=I(003)/I(104)) of (003) and (104) in the X-ray diffraction pattern is $1.0\leq R\leq1.5$.

In the case of R<1.0, the transition metal is mixed into the lithium layer and the Li ion conductivity is decreased. In the case of R>1.5, the two-dimensionality (multitude of layered structures) of the layered positive electrode material is strong, so that the percentage of the transition metal mixed into the lithium layer is small. In the layered positive electrode material by the aforementioned composition, if the temperature of thermal treatment is high upon synthesis, the transition metal is mixed into the lithium layer, resulting in R>1.0, so that the Li ion conductivity is increased, and the specific surface area is reduced due to progress of sintering of primary particles. In contrast, if the temperature of thermal treatment is low upon synthesis, the two-dimensionality of the layered positive electrode material is strong, and progress of the sintering of primary particles is hindered due to a high aspect ratio of the primary particles, so that the specific surface area is increased. In terms of Li ion transfer between the positive electrode material and electrolytic solution, the Li ion conductivity is good when the amount of a solid-liquid interface is large and the specific surface area is high in the positive electrode material. When the specific surface area is less than 0.6 m²/g, the amount of electrolytic solution included in an electrode is small, the internal resistance of battery at −30° C. is increased. However, when the specific surface area is too large, the bulk density of the layered positive electrode material is decreased and the package density of the layered positive electrode material in the electrode is decreased, so that contact in the positive electrode material is deteriorated, resulting in decreased Li ion conductivity for the electrode. Due to the aforementioned reasons, the internal resistance of the battery at −30° C. is also increased when the specific surface area of the positive electrode material exceeds 1.5 m²/g. The inventors found that the features of a positive electrode material that has superior Li ion conductivity include the specific surface area of not less than 0.6 m²/g and not more than 1.5 m²/g, in addition to the aforementioned composition and the intensity ratio of X-ray diffraction. In this case, in order to prepare a positive electrode material that has the aforementioned specific surface area, particle size and calcination time are important when calcinating raw materials. In general, when raw materials of small particle size are calcined in a short time, namely, not more than 10 hours, the specific surface area of the positive electrode material is high, and when the materials are calcined in a long time, namely, not less than 10 hours, the specific surface area is low due to progress of sintering. Preferably, the calcination temperature is not less than 950° C., between 1000° C. and 1100° C., and the calcination time is 10 to 50 hours.

In the positive electrode material that has superior cycle life properties as mentioned above, the crystal structure and the specific surface area have a great influence on the Li ion conductivity at low temperature.

The structure of a positive plate is also important in order to make good use of the positive electrode material that has superior Li ion conductivity. When electrons are transferred in accordance with Li ionic conduction in the positive electrode material, it is necessary to secure a current path from the positive electrode material that has low electron conductivity to a current collector via a conductive material. Securing the current path by the positive electrode material and the conductive material is important, since the Li ion conductivity of electrolyte is significantly decreased at low temperature. The current path may be blocked at low temperature when a positive electrode comprising the positive electrode material, the conductive material and a binder has a lot of holes and includes much electrolytic solution. Meanwhile, Li ions must be supplied to the positive electrode material from the electrolytic solution when performing high rate discharge, and so a suitable amount of electrolytic solution is preferably included in the positive electrode. Thus, the amount of electrolytic solution included in the positive electrode is of central importance. The internal resistance of the battery at low temperature can be reduced when the void percentage is 10 to 35% by weight percent, the void percentage being obtained by dividing the weight of positive electrode soaked in the electrolytic solution by the weight of dried positive electrode. When the void percentage is less than 10%, the internal resistance of the battery rises because of insufficient Li ions supplied to the positive electrode material from the electrolytic solution, and when the void percentage is not less than 36%, the internal resistance of the battery rises because of the blocked current path.

When the aforementioned positive plate that has superior Li ion conductivity and electron conductivity is used for a lithium ion secondary battery, preferably, a negative electrode material also has superior Li ion conductivity and electron conductivity. The internal resistance of the battery at low temperature thus can be reduced by using an amorphous carbon material that has superior Li ion conductivity and electron conductivity, and that has good high rate discharge characteristics for a negative electrode material. In this battery, the internal resistance of the battery at low temperatures is lowest when the open circuit voltage is 3.6 to 3.9 V with the battery 50% charged, thereby performing charge and discharge efficiently. Meanwhile, the internal resistance of the battery is reduced when the open circuit voltage is 3.8 to 4.1 V with 90% of the state of battery charge resulting from the adjustment of the amount of active material for the positive electrode in the positive plate, and the amount of active material for the negative electrode in the negative plate. Preferably, the state of battery charge is 50% for use, since battery operation at low potential is advantageous in terms of the deterioration of electrolytic solution and safety, for example.

In the aforementioned composition of the layered positive electrode material, the Ni atomic ratio in the transition metal is small, namely, less than 45%. Ni is substituted with Mn and Co whose ionic radii are different from that of Ni, so that the volume change of the crystal lattice is reduced, the change being accompanied by the insertion and extraction of lithium ions upon charge and discharge, thereby gaining a positive electrode material that has a superior cycle life.

Moreover, in a layered positive electrode material, the distance between layers increases in accordance with electric charge. This structural instability upon electric charge affects the temperature at the beginning of oxygen desorption from the crystal lattice in addition to the chemical instability of $Co^{4+}$ and $Ni^{4+}$ generated in a charge and oxidation process. In contrast, the layered positive electrode material in which Ni is substituted with chemically stable Mn, has superior thermal stability due to higher temperature at the beginning of oxygen desorption. For the aforementioned cycle life and safety, the percantage of Ni in the transition metal must be less than 45% in the atomic ratio. For the cycle life, the amount of Co included in the transition metal must be not less than 10% in the atomic ratio. For safety, Mn must be included not less than 10% in the atomic ratio. The inventors found that the aforementioned composition of the layered positive electrode material is a composition that has the aforementioned Li ion conductivity, cycle life, and safety.

It is an object of the present invention to provide a positive electrode material that has superior Li ion conductivity at low temperature. It is also an object of the present invention to provide a lithium secondary battery that has high power and high energy density, using the positive electrode material of superior properties.

The inventors found, as a result of the examination of the crystal structures and the specific surface area of various layered positive electrode materials, and of the internal resistance of a battery at low temperature, that the layered positive electrode material that has superior Li ion conductivity at low temperature could be prepared by maximizing the composition and a manufacturing method of the layered positive electrode material and by controlling the crystal structure and the specific surface area of the positive electrode material. Especially important features of the layered positive electrode material according to the present invention are the two-dimensionality and the specific surface area of the crystal structure in the composition including Co that has superior cycle life, and the fact that the aforementioned two-dimensionality and the specific surface area can be controlled by the temperature and time of calcination upon Li introduction.

Embodiment

In the following, examples and comparative examples regarding the present invention are described. The present invention is not limited to the following examples.

EXAMPLE 1

(Preparing Positive Electrode Material)

In the example, manganese dioxide, cobalt oxide, nickel oxide, and lithium carbonate were used as raw materials. After being weighed such that the element ratio was equivalent to a predetermined value, ethanol was added, and the materials were ground by a planetary ball mill in wet condition for five hours, and then mixed. Ater the powders were calcined at 1000° C. for 10 to 30 hours, a layered positive electrode material (1) was gained by crushing the powders.

The gained layered positive electrode material (1) was ground by an agate mortar and X-ray diffraction was carried out using Cu—Kα as a radiation source. The measurement conditions were: 50 kV of-tube voltage; 200 mA of tube current; and 0.01°/second of diffraction speed. The intensity ratio R was obtained by dividing the diffraction peak intensity of a (003) plane by the diffraction peak intensity of a (104) plane. In this case, R was 1.2. Also, the peak intensity ratio R was changed from 0.85 to 1.7 by altering the calcination temperature from 950° C. to 1100° C., using the composition of the positive electrode material (1).

(Property Evaluation of the Positive Electrode Material)

A positive plate for evaluating the properties of the positive electrode material (1) was prepared by the following procedure. A laminated material slurry for the positive electrode was prepared by uniformly mixing a solution in which binder is dissolved in advance in a solvent of N-methyl-2-pyrrolidinone (hereafter abbreviated as NMP), the layered positive electrode material, and a carbon conductive material. In this case, the mixing was conducted such that the ratio of weight percentage of the positive electrode material, the carbon conductive material, and the binder was 85:10.7:4.3, respectively. After the slurry was uniformly applied to an aluminum current collector film whose thickness was 20 μm, it was dried at 100° C., and then pressured at 1.5 ton/cm$^2$ by a press. Consequently, a film whose thickness was about 40 μm was formed A test battery was prepared using the positive plate and a lithium electrode as a counter electrode. In this case, a mixed solvent comprising ethyl carbonate and dimethyl carbonate in which 1.0 mol of LiPF$_6$ was electrolyte was used for an electrolytic solution.

The void percentage of the aforementioned positive plate (1) was evaluated by the following procedure. After the prepared positive plate was dried, it was weighed to calculate the weight of the laminated material by subtracting the weight of the aluminum current collector. Also, after the positive plate was immersed in the electrolytic solution, and then the electrolytic solution adhered on the surface of the positive electrode was wiped off, it was weighed to calculate the weight of the laminated material including electrolytic solution. The void percentage of the aforementioned positive plate was 15%.

The evaluation of the internal resistance of the test battery was conducted by the following procedure. After the battery was charged in constant current/constant voltage up to 4.2 V at 0.25 C of charge rate, it was cooled up to −30° C. Five hours later, the internal resistance of the battery was gained by discharging at 0.5 C of discharge rate. FIG. 1 shows a relationship between the peak intensity ratio R of the positive electrode material (1) ranging from 0.8 to 1.7 and the internal resistance of the battery. FIG. 1 indicates that the internal resistance of the battery is low at −30° C. when the peak intensity ratio R is between 1.0 and 1.5.

The density of the electrode was adjusted using the positive electrode material (1) such that the void percentage of the positive plates were 9% and 36%. Test batteries were prepared using the positive plates, and then the internal resistances of the batteries at −30° C. were measured. When positive plates whose void percentages were 10% and 35% were used, the internal resistances were 1.2 and 1.4 times as large, as compared a battery with the positive plate whose percentage of void was 15%.

Figure 2:
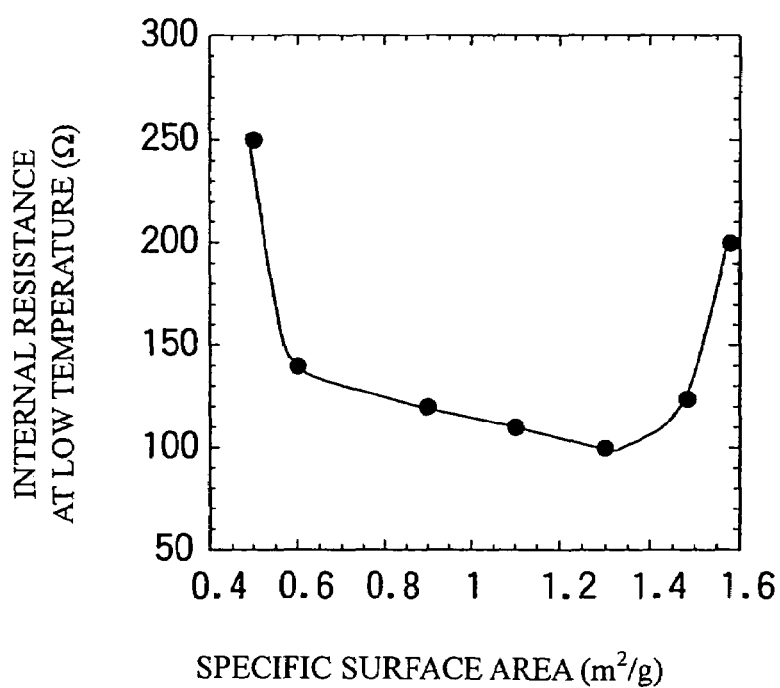
FIG. 2 shows a relationship between the specific surface area and the internal resistance at low temperature.

After the grind and mix time for raw material powders in wet condition by a planetary ball mill was made to be 1, 5, 20, 40, and 80 hours, positive electrode materials were prepared by calcining at 1000° C. in order to change the specific surface area in the composition of the positive electrode material (1). As a result, positive electrode material powders in the composition of the positive electrode material (1) were gained along with the peak intensity ratios R ranging from 1.1 to 1.4 and the BET specific surface areas ranging from 0.5 m$^2$/g to 1.6 m$^2$/g. In this case, the BET specific surface areas were values measured by using nitrogen. Positive plates and test batteries were prepared using the electrode materials by the aforementioned procedure. FIG. 2 shows the evaluation result of the internal resistances of the batteries at −30° C. The internal resistance of the batteries could be reduced when the BET specific surface area was between not less than 0.5 m$^2$/g and not more than 1.6 m$^2$/g.

In the same manner, the intensity ratios of positive plates (2) and (3) in other compositions were measured. Table 1 shows the names of positive electrode materials and the peak intensity ratios. Table 1 also shows the measurement result of the BET specific surface areas of gained layered positive electrode materials. In the positive electrode materials of (1) to (3) of Example 1, the specific surface area was within the range between not less than 0.6 m$^2$/g and not more than 1.5 m$^2$/g at which the internal resistances of the batteries could be reduced at low temperature. Also, the peak intensity ratio R in this case was between 1.2 and 1.4 at which the internal resistances of the batteries could be reduced at low temperature.

TABLE 1

| Active material name | Composition | Peak intensity ratio: R = I(003)/I(104) | BET specific surface area (m$^2$/g) | Internal resistance of test battery (Ω) at low temperature (−30° C.) |
| --- | --- | --- | --- | --- |
| Positive electrode material (1) | $Li_{1.0}Ni_{0.33}Mn_{0.34}Co_{0.33}O_2$ | 1.2 | 1.1 | 90 |
| Positive electrode material (2) | $Li_{1.0}Ni_{0.40}Mn_{0.30}Co_{0.30}O_2$ | 1.4 | 1.2 | 120 |
| Positive electrode material (3) | $Li_{1.0}Ni_{0.30}Mn_{0.40}Co_{0.30}O_2$ | 1.4 | 1.2 | 140 |
| Comparative positive electrode material (1) | $Li_{1.0}Ni_{0.45}Mn_{0.451}Co_{0.090}O_2$ | 1.5 | 1.6 | 250 |
| Comparative positive electrode material (2) | $Li_{1.0}Ni_{0.801}Mn_{0.090}Co_{0.10}O_2$ | 1.5 | 1.7 | 230 |

TABLE 1-continued

| Active material name | Composition | Peak intensity ratio: R = I(003)/I(104) | BET specific surface area ($m^2/g$) | Internal resistance of test battery ($\Omega$) at low temperature ($-30°$ C.) |
|---|---|---|---|---|
| Positive electrode material (4) | $Li_{1.0}Ni_{0.329}Mn_{0.339}Co_{0.329}Al_{0.03}O_2$ | 1.2 | 1.1 | 87 |
| Positive electrode material (5) | $Li_{1.0}Ni_{0.329}Mn_{0.339}Co_{0.329}B_{0.03}O_2$ | 1.2 | 1.1 | 88 |
| Positive electrode material (6) | $Li_{1.0}Ni_{0.329}Mn_{0.339}Co_{0.329}Fe_{0.03}O_2$ | 1.2 | 1.1 | 89 |
| Positive electrode material (7) | $Li_{1.0}Ni_{0.329}Mn_{0.339}Co_{0.329}Cu_{0.03}O_2$ | 1.2 | 1.1 | 87 |
| Positive electrode material (8) | $Li_{1.0}Ni_{0.329}Mn_{0.339}Co_{0.329}Mg_{0.03}O_2$ | 1.2 | 1.1 | 88 |
| Positive electrode material (9) | $Li_{1.0}Ni_{0.329}Mn_{0.339}Co_{0.329}Zn_{0.03}O_2$ | 1.2 | 1.1 | 89 |
| Positive electrode material (10) | $Li_{1.0}Ni_{0.329}Mn_{0.339}Co_{0.329}Ga_{0.03}O_2$ | 1.2 | 1.1 | 88 |
| Positive electrode material (11) | $Li_{1.0}Ni_{0.329}Mn_{0.339}Co_{0.329}Si_{0.03}O_2$ | 1.2 | 1.1 | 89 |

(Preparing Cylindrical Battery)

In order to prepare cylindrical batteries for evaluating the cycle life properties and safety of positive electrode materials, positive plates comprising positive electrode materials (1) to (3) were cut such that the application width was 5.4 cm and the application length was 50 cm. Lead pieces made of aluminum foil were welded so as to take out electric current, and the positive plates were prepared.

In order to prepare the cylindrical batteries by combining with the positive plates, negative plates were prepared. A laminated material slurry for the negative electrode was prepared in which a pseudo isotropic carbon material (hereafter abbreviated as PIC), which was a negative electrode material and amorphous carbon, and a material dissolved in the NMP were mixed. In this case, the dry weight ratio of the PIC material and binder was made to be 92:8. The slurry was uniformly applied to a rolled copper foil whose thickness was 10 μm. After being compressed and formed by a roll press machine, the foil was cut such that the application width was 5.6 cm and the application length was 54 cm. Lead pieces made of copper foil were welded, and the negative plates were prepared.

Figure 3:
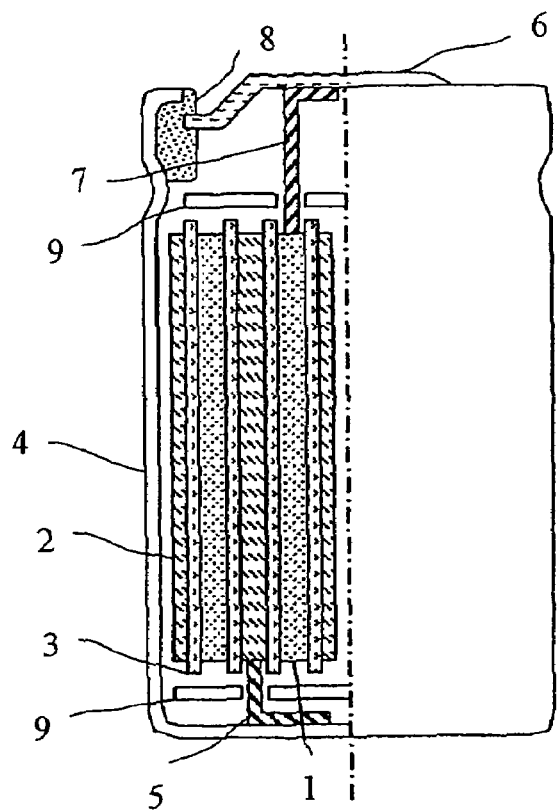
FIG. 3 shows a cutout cross section of an arrangement of a lithium ion secondary battery according to the present invention.
Figure 4:
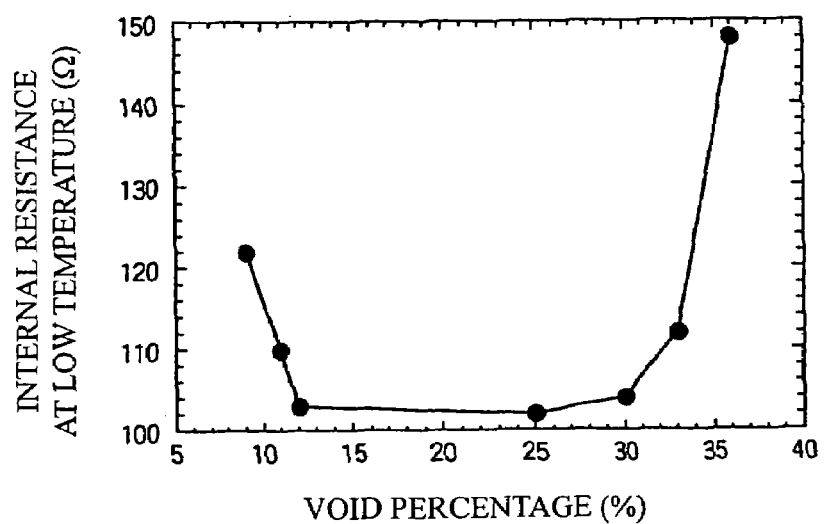
FIG. 4 shows a relationship between the void percentage of in a positive plate and the internal resistance at low temperature.
Figure 5:
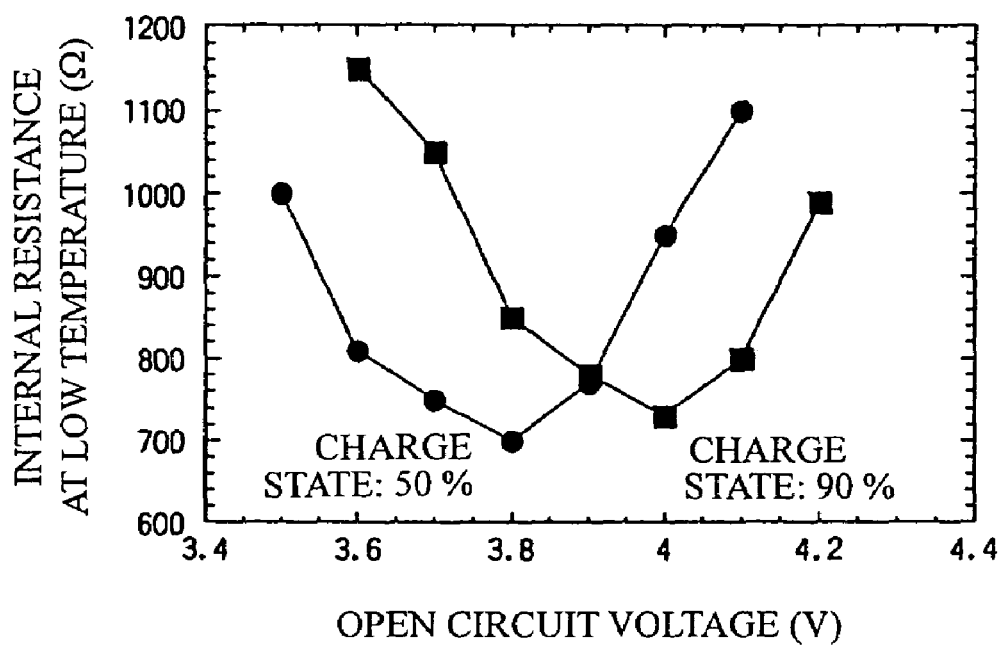
FIG. 5 shows a relationship between the open circuit voltage of a battery and the internal resistance at low temperature.

Cylindrical batteries as schematically shown in FIG. 3 were prepared by the following procedure using the prepared positive plates and negative plates. Groups of electrodes were prepared by disposing separators 3 between positive plates 1 and negative plates 2 such that the positive plates 1 and negative plates 2 did not directly contact, and then by winding them. In this case, lead pieces 7 of the positive plates and lead pieces 5 of the negative plates were disposed such that they were each positioned in both opposite ends of the groups of electrodes. In addition, the positive plates and the negative plates were disposed such that a laminated material-applied portion of the positive electrode did not protrude from a laminated material-applied portion of the negative electrode. Separators used in this case were microporous polypropylene films that had thickness of 25 μm and width of 5.8 cm. The groups of electrodes were inserted into an SUS-made battery cans 4, the negative electrode lead pieces 5 were welded to the bottoms of the cans, and the positive electrode lead pieces 7 were welded to sealed lid portions 6 which also functioned as positive current terminals. After nonaqueous electrolytic solution (1.0 mol/liter of $LiPF_6$ was dissolved in a mixed solvent of EC and DMC with a volume ratio of 1:2) was injected to the battery cans in which the groups of electrodes were disposed, the sealed lid portions 6 to which packings 8 were attached were caulked with the battery cans 4 to seal. The cylindrical batteries had a diameter of 18 mm and a length of 65 mm. In this case, the sealed lid portions had split valves for venting pressure of the insides of the batteries by cleaving when the pressure of the insides of the batteries was increased. Numeral 9 indicates an insulator.

Cylindrical batteries were prepared by the aforementioned preparation method using the positive electrode material (1), the positive electrode material (2), and the positive electrode material (3) of Example 1. In this case, a cylindrical battery comprising the positive electrode material (1) was a battery (1). In the same manner, the positive electrode material (2) was used for a battery (2), and the positive electrode material (3) was used for a battery (3).

(Property Evaluation of Lithium Secondary Battery)

Evaluation of the properties of charge/discharge cycle of the prepared batteries was conducted using charge-end voltage of 4.2 V, discharge-end voltage of 3.0 V, and discharge rate of 0.5 C. Table 2 shows the result of 200-cycle operating life test in each battery. When the Ni composition in the transition metal was not more than 44%, the percentage of capacity maintenance was not less than 85%. However, the percentage of capacity maintenance was 54% and deterioration in the cycle life was confirmed when after-mentioned comparative positive electrode materials whose Ni composition was not less than 0.45 were used.

(Safety Evaluation of Lithium Secondary Battery)

Internal short circuit tests (nail stick test) were conducted in order to examine the safety of each lithium secondary battery (1) to (3) prepared by using the positive electrode materials (1) to (3) of Example 1. The charge condition of the test was constant current/constant voltage charge. After a constant current charge with charge current of 200 mA up to charge end voltage of 4.25 V, charge was carried out for eight hours with constant current of 4.25 V. After 10 batteries were charged for the batteries (1) to (3), nails that had a diameter of 5 mm were used to penetrate each battery from the side at the penetration speed of 10 cm/minute, and the development of abnormalities such as the operation of the split valve, ignition, burst, for example were observed. By the aforementioned procedure, the percentage of abnormality development was examined in each of the 10 batteries.

Table 2 shows the number of batteries where abnormalities were confirmed when the internal short circuit test was conducted. In batteries (1) to (3) in which positive electrode materials of Example 1 were used, abnormalities such as the operation of the split valve, ignition, burst, for example were not observed.

ing a deterioration in cycle life as compared with the batteries (1) to (3) in Example 1.

Table 2 further shows the results of a short-circuit test conducted in the same manner as in Example 1. Abnormality developed in comparative battery (2) in which the comparative positive electrode material (2) with a small Mn content was used.

TABLE 2

| Battery name | Composition | Percentage of capacity maintenance at 200 cycles (%) | Number of abnormal batteries in short circuit test |
|---|---|---|---|
| Battery (1) | $Li_{1.0}Ni_{0.33}Mn_{0.34}Co_{0.33}O_2$ | 87 | 0 |
| Battery (2) | $Li_{1.0}Ni_{0.40}Mn_{0.30}Co_{0.30}O_2$ | 85 | 0 |
| Battery (3) | $Li_{1.0}Ni_{0.30}Mn_{0.40}Co_{0.30}O_2$ | 85 | 0 |
| Comparative battery (1) | $Li_{1.0}Ni_{0.45}Mn_{0.451}Co_{0.090}O_2$ | 54 | 0 |
| Comparative Battery (2) | $Li_{1.0}Ni_{0.801}Mn_{0.090}Co_{0.10}O_2$ | 70 | 8 |
| Battery (4) | $Li_{1.0}Ni_{0.329}Mn_{0.339}Co_{0.329}Al_{0.03}O_2$ | 88 | 0 |
| Battery (5) | $Li_{1.0}Ni_{0.329}Mn_{0.339}Co_{0.329}B_{0.03}O_2$ | 88 | 0 |
| Battery (6) | $Li_{1.0}Ni_{0.329}Mn_{0.339}Co_{0.329}Fe_{0.03}O_2$ | 88 | 0 |
| Battery (7) | $Li_{1.0}Ni_{0.329}Mn_{0.339}Co_{0.329}Cu_{0.03}O_2$ | 88 | 0 |
| Battery (8) | $Li_{1.0}Ni_{0.329}Mn_{0.339}Co_{0.329}Mg_{0.03}O_2$ | 88 | 0 |
| Battery (9) | $Li_{1.0}Ni_{0.329}Mn_{0.339}Co_{0.329}Zn_{0.03}O_2$ | 88 | 0 |
| Battery (10) | $Li_{1.0}Ni_{0.329}Mn_{0.339}Co_{0.329}Ga_{0.03}O_2$ | 88 | 0 |
| Battery (11) | $Li_{1.0}Ni_{0.329}Mn_{0.339}Co_{0.329}Si_{0.03}O_2$ | 88 | 0 |

Comparative Example 1

In this comparative example, comparative positive electrode materials (1) and (2) with the compositions shown in Table 1 that had been prepared by the same procedure as in Example 1 were subjected to X-ray diffraction and BET specific surface area measurements in the same procedure as in Example 1.

Table 1 shows the names of the comparative positive electrode materials, the peak intensity ratio R, and BET specific surface area. While in the case of the comparative positive electrode material (1), calcination was conducted at 1100° C. for 100 hours so as to obtain a peak intensity ratio R of 1.5 or lower, the two-dimensionality of the material with this composition was so strong that the specific surface area was 1.6 m²/g and could not be made 1.5 m²/g or lower. In the case of comparative positive electrode material (2) too, calcination was conducted at 1100° C. for 100 hours so as to obtain a peak intensity ratio R of 1.5 or lower, the specific surface area was 1.7 m²/g and could not be made 1.5 m²/g or lower.

Test batteries were prepared using comparative positive electrode materials (1) and (2) in the same manner as in Example 1. Table 1 further shows the results of measuring the internal resistance of the test batteries at −30° C. The internal resistance of the test batteries using the comparative positive electrode materials was 230 to 250 Ω, which was higher than the values obtained when the positive material in Example 1 was used.

Cylindrical batteries were then prepared using comparative positive electrode materials (1) and (2) in the same manner as in Example 1, obtaining a comparative battery (1) and (2), respectively. Their charge/discharge cycle characteristics were evaluated in the same manner as in Example 1, and the results are shown in Table 2. In the comparative batteries (1) and (2), in which the Ni composition ratio in the transitional metals is not less than 45% by atomic ratio, the percentage of capacity maintenance was 80% or less at 200 cycles, indicat-

EXAMPLE 2

In this example, positive electrode materials (4) to (11) with the compositions shown in Table 1 (in which the transition metals were substituted with Al, B, Fe, Cu, Mg, Zn, Ga, or Si) were prepared in the same procedure as in Example 1, and these materials were subjected to X-ray diffraction and BET specific surface area measurement in the same procedure as in Example 1. The raw materials for the elements for substitution were oxides, which were mixed with other oxide raw materials using a planetary ball mill.

Positive electrode materials (4), (5), (6), (7), (8), (9), (10), and (11) were prepared by substituting the transition metals with Al, B, Fe, Cu, Mg, Zn, Ga, and Si, respectively. Table 1 shows their peak intensity ratios R and BET specific surface areas, which were substantially identical to those of the positive electrode material (1) in Example 1.

Test batteries were then prepared using the positive electrode materials (4) to (11) in the same manner as in Example 1, and their internal resistance was measured. The results are shown in Table 1, from which a decrease in battery internal resistance can be recognized.

Then, cylindrical batteries were prepared using the positive electrode materials (4) to (11) in the same manner as in Example 1, obtaining batteries (4) to (11), respectively. Table 2 shows the results of evaluation of their charge/discharge cycle characteristics that was conducted in the same manner as in Example 1. The results showed an improvement in cycle life for the compositions substituted with Al, B, Fe, Cu, Mg, Zn, Ga, or Si.

Table 2 further shows the results of a short-circuit test conducted in the same manner as in Example 1. No abnormality developed in batteries (4) to (11) in which positive electrode materials (4) to (11) were used.

Comparative Example 2

In this comparative example, comparative positive electrode material (3) was prepared in the same procedure as in Example 1 such that it had a chemical formula $Li_{1.02}Mn_{0.40}Ni_{0.55}Co_{0.05}O_2$, and the material was subjected to X-ray diffraction and BET specific surface area measurements in the same manner as in Example 1. When an intensity ratio R2 of the total intensity of diffraction peak intensity I012 in the (012) plane and diffraction peak intensity I006 in the (006) plane, to diffraction peak intensity I101 in the (101) plane was calculated by X-ray diffraction, R2 was 0.45. A test battery was then prepared using the comparative positive electrode material (3) in the same manner as in Example 1, and its internal resistance was measured at −30° C. The measured resistance was not less than 230 Ω.

EXAMPLE 3

Using the positive electrode material (1) in Example 1, the electrode density was adjusted in such a manner as to obtain a void percentage of 9% to 36% in the positive plate. A test battery was then prepared using this positive plate, and its internal resistance was measured at −30° C. The results showed that, as compared with the positive plate with void percentage of 12% to 24%, the internal resistance of the positive plate with the void percentage of 9% and 36% was 1.2 and 1.4 times as large, respectively.

Using the positive electrode material (4) of Example 2, test batteries were prepared with positive plates having the same void percentage as those mentioned above, and their internal resistance was measured. The results were identical to those mentioned above.

EXAMPLE 4

The capacity of a battery (1) using the positive electrode material (1) of Example 1 was measured. The charge conditions were such that the battery was charged with a constant charge current of 200 mA up to a charge-end voltage of 4.2 V, followed by charging with a constant voltage of 4.2 V, for a total of eight hours, in a constant current/constant voltage charge procedure. Discharge was based on a constant-current discharge procedure using a discharge current of 200 mA and a discharge-end voltage of 2.5 V. Then, the charge state of the battery was set at 50%, and the battery's internal resistance was measured at −30° C. with an open circuit voltage of 3.5 to 4.0 V. The internal resistance could be lowered when the open circuit voltage was 3.6 to 3.9 V. On the other hand, when the battery charge state was set at 90% by adjusting the amount of positive-electrode active material in the positive plate and the negative-electrode active material in the negative plate, the internal resistance decreased when the open circuit voltage was 3.8 to 4.1 V.

EXAMPLE 5

Figure 6:
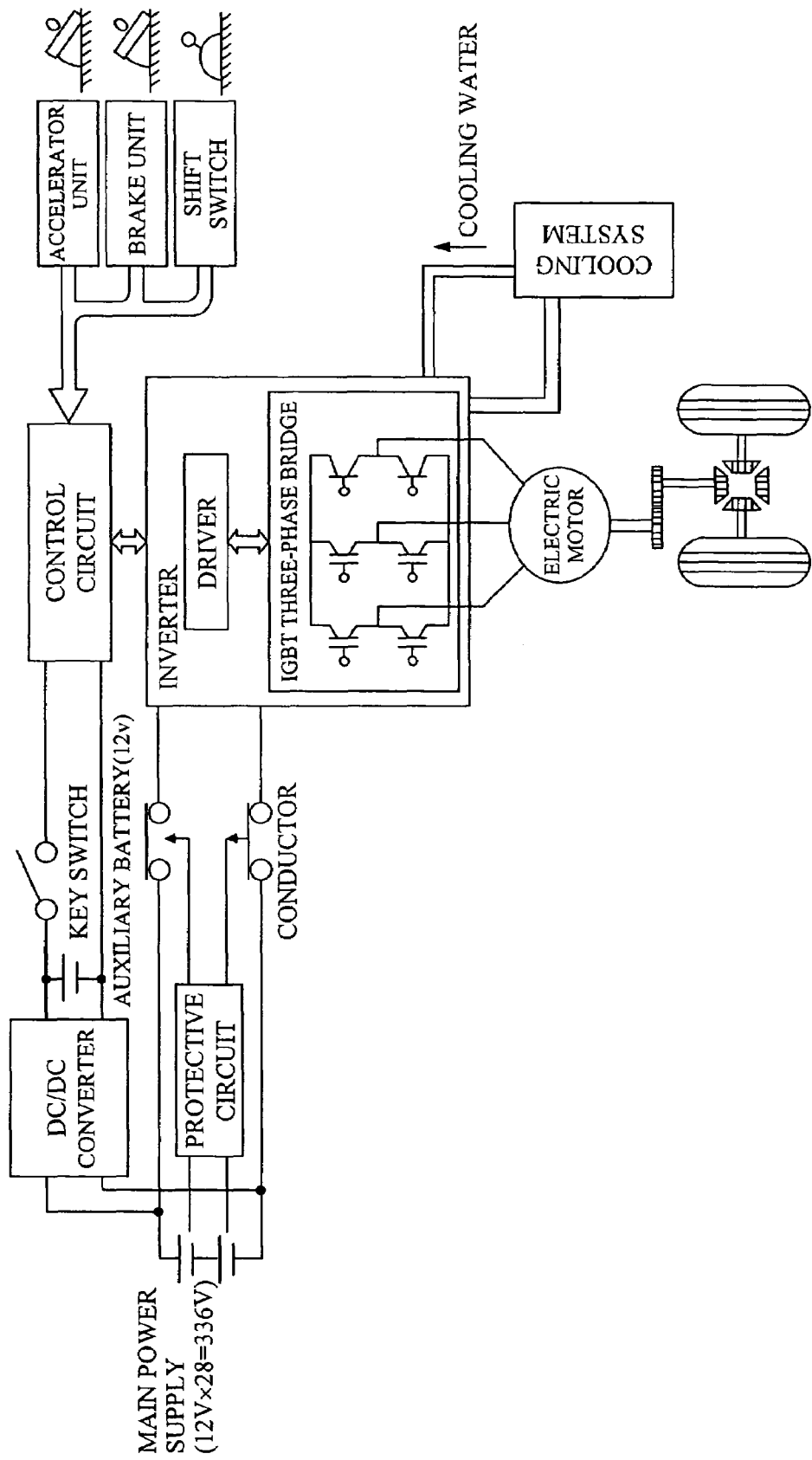
FIG. 6 shows a driving system configuration of an electric automobile that uses a lithium secondary battery according to the present invention.

FIG. 6 shows a drive system configuration for an electric vehicle using the lithium secondary battery described in Example 4.

As the key switch is turned on as in normal gasoline vehicles and the accelerator pedal is depressed, the torque or rotation of an electric motor is controlled in accordance with the angle of depression of the accelerator pedal. When the pedal is released, regenerative braking that corresponds to engine braking is activated. When the brake pedal is depressed, the regenerative braking force is increased. A shift lever signal causes the switching between forward and backward movement of the vehicle. Transmission ratio is constant. In the present example, in which the control system employs an IGBT vector control inverter system using an induction motor and the power supply voltage is 320 V in accordance with the IGBT withstand voltage, a maximum output is set at 45 KW and a maximum torque is set at 176 N·m from the viewpoint of power performance (accelerating ability and gradability) as an automobile, and the rated output is 30 KW in accordance with the maximum speed specification. Major control items include a fail-safe control, as well as the forward and backward control and regenerative control of the vehicle. Since the battery used in the present example has superior low-temperature characteristics, the battery can be used in an electric vehicle under low-temperature condition of −30° C.

The lithium secondary battery according to the invention, whose applications are not particularly limited, can be suitably used as a medium- to high-capacity power supply in a variety of industrial equipment applications. For example, it is suitable for electric vehicles, light vehicles, and hybrid vehicles or self-powered vehicles in which both a motive power supply driven by various motive force engines and electric motors are employed. Other applications of the lithium secondary battery of the invention include medium-capacity household electric appliances.

What is claimed is:

1. A positive electrode material for a nonaqueous lithium secondary battery, said positive electrode material comprising a complex oxide having a layered structure expressed by a chemical formula $Li_aMn_xNi_yCo_zO_2$ ($0 \leq a \leq 1.2$, $0.1 \leq x \leq 0.9$, $0 \leq y \leq 0.44$, $0.1 \leq z \leq 0.6$, $x+y+z=1$), wherein a diffraction peak intensity ratio between the (003) plane and the (104) plane (I(003)/I(104)) in an X-ray powder diffractometry using a Cu—Kα line in the X-ray source is not less than 1.2 and not more than 1.4.

2. A positive electrode material for a nonaqueous lithium secondary battery, said positive electrode material comprising a complex oxide having a layered structure expressed by a chemical formula $Li_aMn_xNi_yCo_zM_\alpha O_2$ (M is a metal element with an ion radius smaller than that of $Ni^{2+}$; $0<a \leq 1.2$, $0.1 \leq x \leq 0.9$, $0 \leq y \leq 0.44$, $0.1 \leq z \leq 0.6$, $0.01 \leq \alpha \leq 0.1$, $x+y+z+\alpha=1$), wherein a diffraction peak intensity ratio between the (003) plane and the (104) plane (I(003)/I(104)) in an X-ray powder diffractometry using a Cu—Kα line in the X-ray source is not less than 1.2 and not more than 1.4.

3. The positive electrode material for a lithium secondary battery according to claim 2, wherein M in said chemical formula is at least one selected from the group consisting of Al, B, Fe, Cu, Mg, Zn, Ga, and Si.

4. The positive electrode material for a lithium secondary battery according to claim 1, wherein the specific surface area is 0.6 to 1.5 m²/g.

5. The positive electrode material for a lithium secondary battery according to claim 2, wherein the specific surface area is 0.6 to 1.5 m²/g.

6. A positive plate comprising at least one of the positive electrode material for a lithium secondary battery according to claim 1, said positive plate further comprising a current collector on which an electrode laminated material is coated, said electrode laminated material including a conductive material consisting of said positive electrode material, graphite, and/or amorphous carbon powder, and a binder material for binding said conductive material and said positive electrode material, wherein void percentage per weight of the laminated material of said positive plate is 10 to 35 wt %.

7. A positive plate comprising at least one of the positive electrode material for a lithium secondary battery according to claim 2, said positive plate further comprising a current collector on which an electrode laminated material is coated, said electrode laminated material including a conductive material consisting of said positive electrode material, graphite, and/or amorphous carbon powder, and a binder material for binding said conductive material and said positive electrode material, wherein void percentage per weight of the laminated material of said positive plate is 10 to 35 wt %.

8. A nonaqueous lithium secondary battery comprising the positive plate of claim 6 and a negative electrode, wherein said positive electrode and said negative electrode are disposed via a porous film, said negative electrode being made of amorphous carbon, and wherein the open circuit voltage is 3.6 to 3.9 V at a 50% charge state of the battery.

9. A nonaqueous lithium secondary battery comprising the positive plate of claim 7 and a negative electrode, wherein said positive electrode and said negative electrode are disposed via a porous film, said negative electrode being made of amorphous carbon, and wherein the open circuit voltage is 3.6 to 3.9 V at a 50% charge state of the battery.

10. Electric equipment comprising the lithium secondary battery of claim 8 as a power supply.

11. Electric equipment comprising the lithium secondary battery of claim 9 as a power supply.

* * * * *